US011904693B2

(12) United States Patent
Matsuda (10) Patent No.: US 11,904,693 B2
(45) Date of Patent: Feb. 20, 2024

(54) OFF-ROAD VEHICLE

(71) Applicant: KAWASAKI JUKOGYO KABUSHIKI KAISHA, Hyogo (JP)

(72) Inventor: Yoshimoto Matsuda, Kobe (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 2 days.

(21) Appl. No.: 17/340,302

(22) Filed: Jun. 7, 2021

(65) Prior Publication Data

US 2022/0388387 A1 Dec. 8, 2022

(51) Int. Cl.
| | |
|---|---|
| *B60K 5/04* | (2006.01) |
| *B60K 13/02* | (2006.01) |
| *B60P 1/16* | (2006.01) |
| *B60K 13/04* | (2006.01) |
| *B60K 5/00* | (2006.01) |

(52) U.S. Cl.
CPC ............... *B60K 5/04* (2013.01); *B60K 13/02* (2013.01); *B60K 13/04* (2013.01); *B60P 1/16* (2013.01); *B60K 2005/003* (2013.01); *B60Y 2200/20* (2013.01)

(58) Field of Classification Search
CPC .......... B60K 5/04; B60K 13/02; B60K 13/04; B60K 2005/003; B60P 1/16; B60Y 2200/20
See application file for complete search history.

(56) References Cited

U.S. PATENT DOCUMENTS

| | | | |
|---|---|---|---|
| 9,255,623 B2 * | 2/2016 | Yano ...................... F16F 15/265 |
| 9,738,134 B1 * | 8/2017 | Rittenour ................ F02B 67/04 |
| 10,112,659 B2 * | 10/2018 | Tsumiyama ............... B60P 1/28 |
| 10,393,004 B2 * | 8/2019 | Orihashi ................ F16F 15/264 |
| 10,493,892 B2 * | 12/2019 | Tsumiyama ........... B62D 33/02 |
| 10,724,420 B2 * | 7/2020 | Momosaki .......... F01N 13/1805 |
| 11,148,525 B2 * | 10/2021 | Eck .......................... B60K 8/00 |
| 11,181,080 B2 * | 11/2021 | Bouchard ............... B60K 13/02 |
| 11,318,830 B2 * | 5/2022 | Iwata ................. F02M 35/0204 |
| 2007/0095335 A1 * | 5/2007 | Matsuda ............. F01M 13/021 |
| | | | 123/198 C |
| 2009/0195049 A1 * | 8/2009 | Shimamura ............. B60P 1/283 |
| | | | 298/12 |
| 2013/0319785 A1 * | 12/2013 | Spindler ................ B60R 21/13 |
| | | | 180/291 |

(Continued)

FOREIGN PATENT DOCUMENTS

| | | | |
|---|---|---|---|
| CN | 107804208 A | * | 3/2018 |
| KR | 20140128785 A | * | 11/2014 |

OTHER PUBLICATIONS

Translated KR-20140128785-A (Year: 2023).*

*Primary Examiner* — James A Shriver, II
*Assistant Examiner* — Ian Bryce Shelton
(74) *Attorney, Agent, or Firm* — Wenderoth, Lind & Ponack, L.L.P.

(57) ABSTRACT

An off-road vehicle, including: an engine body having a cylinder and a crankshaft that extends in a horizontal direction; and a transmission disposed adjacent to the engine body in a direction orthogonal to an axial direction of the crankshaft in a horizontal direction, in which the cylinder has a center axis inclining to an opposite side to a direction in which the transmission is disposed in a horizontal direction or extending horizontally to the opposite side.

9 Claims, 4 Drawing Sheets

(56) References Cited

U.S. PATENT DOCUMENTS

| | | | |
|---|---|---|---|
| 2014/0224563 A1* | 8/2014 | Shinbori | B60G 3/20 |
| | | | 180/291 |
| 2014/0274515 A1* | 9/2014 | Takahashi | F16H 57/035 |
| | | | 474/150 |
| 2015/0175047 A1* | 6/2015 | Takahashi | B60P 1/04 |
| | | | 298/17 R |
| 2016/0091077 A1* | 3/2016 | Sotani | B60K 17/344 |
| | | | 74/606 R |
| 2016/0311302 A1* | 10/2016 | Uki | B60K 5/1241 |
| 2017/0001549 A1* | 1/2017 | Bessho | B60L 53/80 |
| 2017/0036717 A1* | 2/2017 | Wakabayashi | B60H 1/00285 |
| 2017/0174069 A1* | 6/2017 | Oyama | B60R 21/131 |
| 2019/0367086 A1* | 12/2019 | De Grammont | B60G 7/001 |
| 2020/0086731 A1* | 3/2020 | Yohannes | F16H 57/025 |
| 2020/0122560 A1 | 4/2020 | Ward et al. | |
| 2021/0213822 A1* | 7/2021 | Ripley | B62D 21/10 |
| 2021/0237802 A1* | 8/2021 | Chalifour | B62D 27/00 |

\* cited by examiner

OFF-ROAD VEHICLE

BACKGROUND OF THE INVENTION

Technical Field

The present invention relates to an off-road vehicle.

Related Art

US2020/0122560A1 discloses an off-road vehicle including an engine and a transmission rearward the riding space. This engine includes an oil pan, a crankcase, a cylinder, and a cylinder head in order from below. The transmission is provided behind the engine. In this engine, the center axis of the cylinder is inclined rearward, and the overall height of the engine is reduced compared with the case where the center axis extends vertically.

SUMMARY

However, in US2020/0122560A1, since the transmission is positioned behind the engine, the rearward inclination of the center axis of the cylinder is limited to a range where the engine does not interfere with the transmission. As a result, it is impossible to sufficiently reduce the overall height of the engine.

An object of the present invention is to provide an off-road vehicle capable of having the overall height of the engine body reduced.

The present invention provides
an off-road vehicle, including:
an engine body having a cylinder and a crankshaft that extends in a horizontal direction; and
a transmission disposed adjacent to the engine body in a direction orthogonal to an axial direction of the crankshaft in a horizontal direction, in which
the cylinder has a center axis inclining to an opposite side to a direction in which the transmission is disposed in a horizontal direction or extending horizontally to the opposite side.

According to the present invention, it is possible to easily reduce the overall height of the engine body by configuring the cylinder such that the center axis thereof inclines in the horizontal direction or extends horizontally. Thus, it is possible to configure the engine body to be compact in the vertical direction, and it is hence possible to prevent the center of gravity from becoming high while ensuring the ground clearance. Moreover, since the cylinder inclines to the opposite side to the transmission or extending horizontally to the opposite side, the cylinder is easily configured to incline or extend horizontally while preventing interference between the cylinder and the transmission.

By reducing the overall height of the engine body, it is easy to ensure the mountability of the engine body to an off-road vehicle while ensuring the ground clearance (minimum height from the road surface) in the engine body required for the off-road vehicle.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

First Embodiment

A vehicle 100 according to the first embodiment of the present invention will be described with reference to FIGS. 1 to 6. The vehicle 100 according to the present embodiment is an off-road vehicle configured to be able to travel on an irregular road surface. In the following description, the front-rear direction, the right-left direction, and the up-down direction as viewed from the driver on board the vehicle 100 are the front-rear direction, the right-left direction, and the up-down direction of the vehicle 100 and components.

Figure 1:
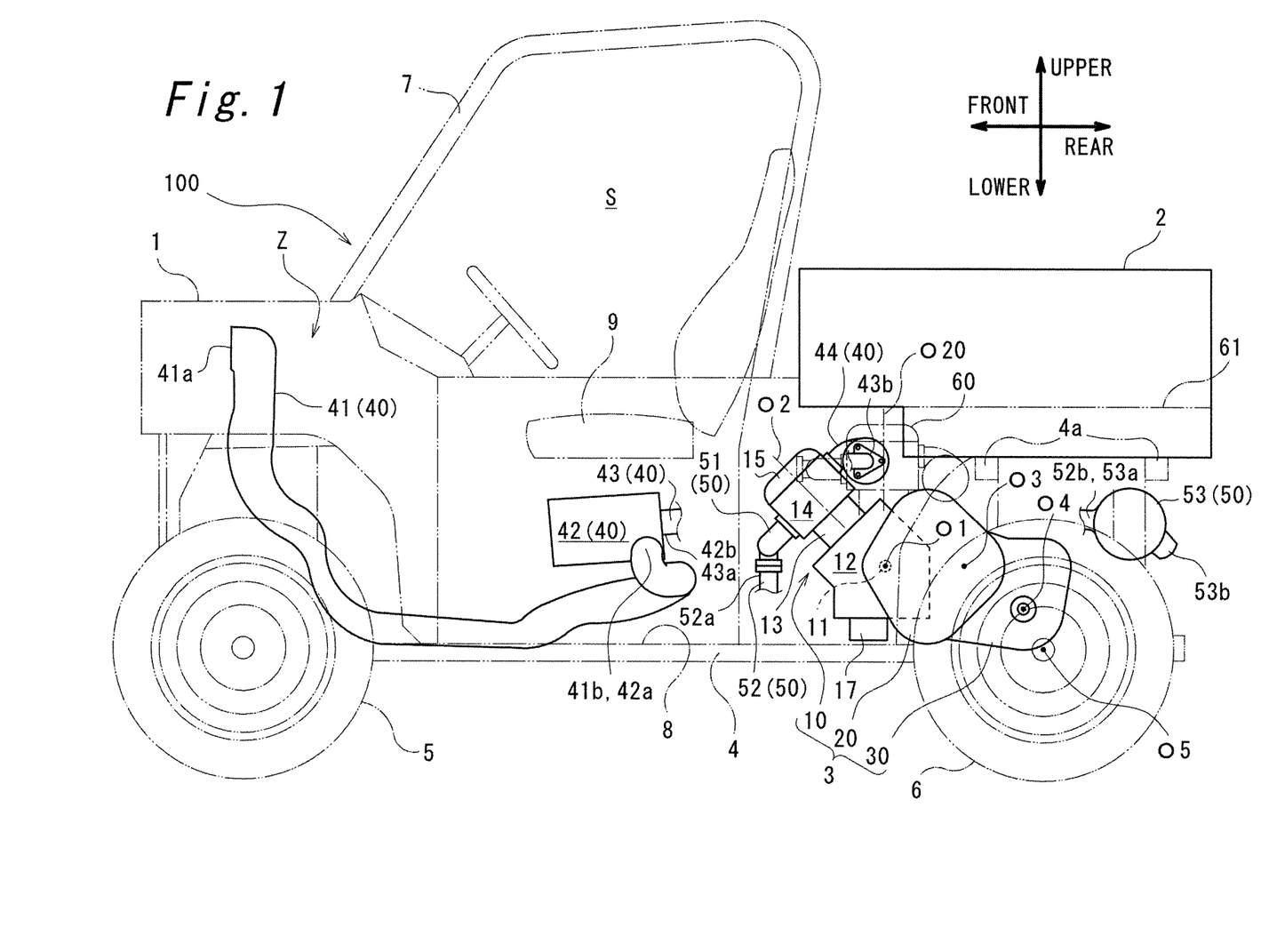
FIG. 1 is a left side view of an off-road vehicle according to a first embodiment of the present invention.

FIG. 1 is a left side view of the vehicle 100. As shown in FIG. 1, the vehicle 100 has a vehicle body 1, a cargo bed 2 supported by the vehicle body 1, and a power train mechanism 3 mounted on the vehicle body 1. In FIG. 1, the vehicle body 1 is indicated by a two-dot chain line, and the cargo bed 2 and the power train mechanism 3 are indicated by solid lines.

The vehicle body 1 includes a vehicle body frame 4 constituting a skeleton. In the vehicle body 1, a pair of right and left front wheels 5 are disposed on both front side portions of the vehicle body frame 4, and a pair of right and left rear wheels 6 are disposed on both rear side portions of the vehicle body frame 4. A riding space S in which an occupant rides is positioned between the front wheel 5 and the rear wheel 6. The vehicle body 1 has a vehicle body floor 8 constituting the bottom portion of the riding space S. The riding space S is surrounded by a rollover protective structure (ROPS: Roll cage-like frame structure and part of the vehicle body frame 4) 7. A seat 9 is disposed in the riding space S. The cargo bed 2 is provided behind the seat 9.

The vehicle body frame 4 has a cargo bed support frame 4a that supports the cargo bed 2 from below. In the present embodiment, the cargo bed support frame 4a extends in the right-left direction at two places separated to front and rear direction below the cargo bed 2. Alternatively, the cargo bed support frame 4a may be configured to extend in the front-rear direction at two places separated to left and right. The cargo bed 2 is fixed immovably to the upper surface of the cargo bed support frame 4a. The power train mechanism 3 is mounted on the vehicle body frame 4 below the cargo bed 2.

The power train mechanism 3 includes an engine body 10, a clutch 20, and a transmission 30. The vehicle 100 is configured such that the rotation torque output from the engine body 10 is transmitted to the transmission 30 via the clutch 20, and is changed in a rotation speed by the transmission 30 to be transmitted to the front wheels 5 and the rear wheels 6. The power train mechanism 3 further has an intake system 40 that takes air into the engine body 10 and an exhaust system 50 that exhausts the exhaust gas discharged from the engine body 10.

Figure 2:
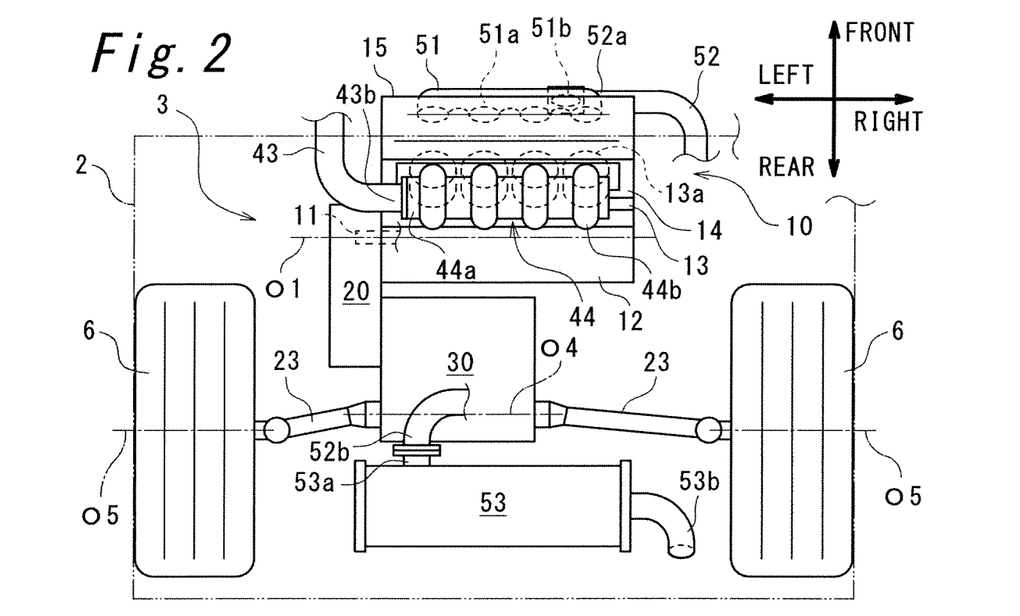
FIG. 2 is a top view around the cargo bed of FIG. 1.

The engine body 10 has a crankshaft 11 as an output shaft for outputting rotation torque. Referring also to FIG. 2, in the present embodiment, the engine body 10 is a four-cycle in-line four-cylinder engine in which a center axis O1 of the crankshaft 11 extends in the vehicle width direction. The engine body 10 has a crankcase 12, a cylinder block 13, a cylinder head 14, and a cylinder head cover 15.

In the present embodiment, the transmission 30 is disposed rearward the vehicle body with respect to the engine body 10. In other words, the transmission 30 is disposed adjacent to the engine body 10 in a direction orthogonal to a direction (hereinafter referred to as an axial direction of the crankshaft 11) parallel to the center axis O1 of the crankshaft 11 in the horizontal direction. The clutch 20 is disposed so as to be coupled to the left side surfaces of each of the engine body 10 and the transmission 30.

Figure 3:
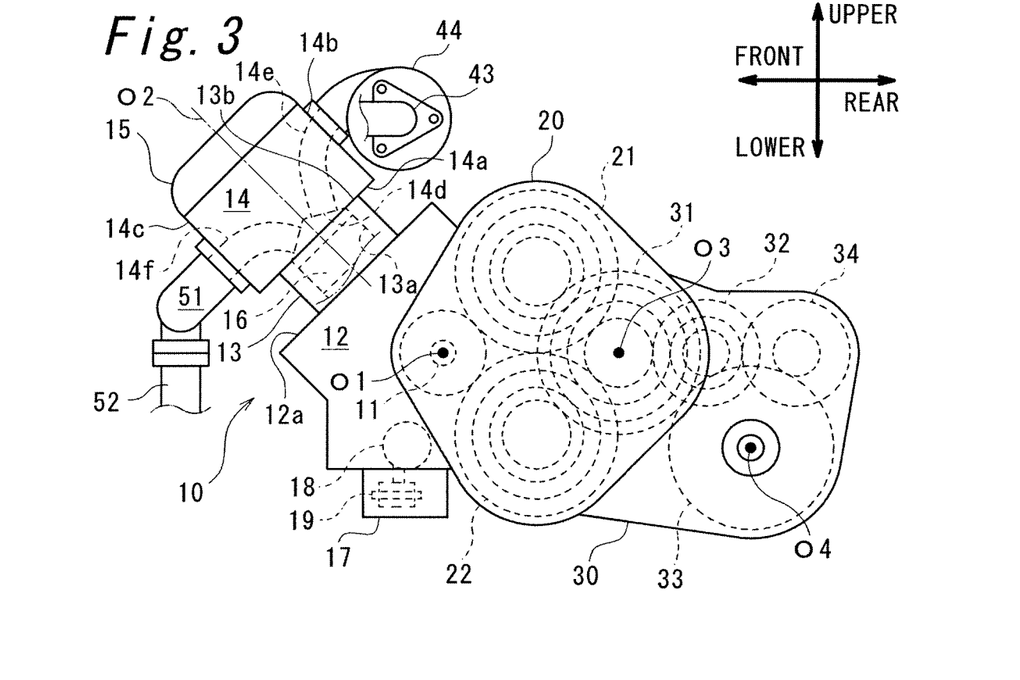
FIG. 3 is an enlarged left side view of an engine body, a clutch, and a transmission.

FIG. 3 is an enlarged left side view of the engine body 10, the clutch 20, and the transmission 30. The crankcase 12 rotatably supports the crankshaft 11. The crankcase 12 has a cylinder block coupling surface 12a in an upper portion. In the present embodiment, the cylinder block coupling surface 12a inclines forward and downward. In other words, the cylinder block coupling surface 12a faces obliquely upward in front of the vehicle body.

The cylinder block 13 is coupled to the cylinder block coupling surface 12a of the crankcase 12. Referring also to FIG. 2, four cylinders 13a are formed in the cylinder block 13. In each of the four cylinders 13a, a piston 16 reciprocates in accordance with the rotation of the crankshaft 11. A center axis O2 of the cylinder 13a extends perpendicularly with respect to the cylinder block coupling surface 12a and inclines forward and upward. In other words, the center axis O2 of the cylinder 13a inclines upward to the side (front side) opposite to the side (rear side) on which the transmission 30 is disposed in the horizontal direction.

The cylinder block 13 has a cylinder head coupling surface 13b at an end on the opposite side to the crankcase 12 in a direction parallel to the center axis O2.

The cylinder head 14 is coupled to the cylinder head coupling surface 13b of the cylinder block 13. The cylinder head 14 has a bottom surface 14a coupled to the cylinder block 13, a first side surface 14b positioned at a rear edge portion of the bottom surface 14a, and a second side surface 14c positioned at a front edge portion of the bottom surface 14a.

The first side surface 14b is positioned on one side on which the transmission 30 is positioned in a direction orthogonal to both the axial direction of the crankshaft 11 and the direction (hereinafter referred to as the axial direction of the cylinder 13a) parallel to the center axis O2 of the cylinder 13a. The second side surface 14c is positioned on the other side in a direction orthogonal to both of the axial directions parallel to the center axes O1 and O2. The first side surface 14b and the second side surface 14c each extend along the axial direction O2 of the cylinder 13a.

In other words, of the first side surface 14b and the second side surface 14c, the first side surface 14b is positioned in the cylinder head 14 on the upper side close to the cargo bed 2, and the second side surface 14c is positioned in the cylinder head 14 on the lower side opposite to the cargo bed 2.

On the bottom surface 14a, a recess portion 14d constituting a combustion chamber together with the cylinder 13a and the piston 16 is formed. In the cylinder head 14, an intake port 14e connected to the intake system 40 by communicating the recess portion 14d with the first side surface 14b, and an exhaust port 14f connected to the exhaust system 50 by communicating the recess portion 14d with the second side surface 14c are further formed. That is, the intake port 14e constitutes a part of an intake path for taking in intake air into the engine body 10, and the exhaust port 14f constitutes a part of an exhaust path for discharging exhaust gas from the engine body 10. The intake port 14e and the exhaust port 14f are disposed side by side in the vehicle body front-rear direction with the cylinder head 14 interposed therebetween. The intake port 14e and the exhaust port 14f are provided for each cylinder 13a, i.e., four of each of them are provided.

When the bottom surface 14a is not provided with the recess portion 14d, the intake port 14e is provided so as to communicate the bottom surface 14a corresponding to the combustion chamber with the first side surface 14b, and the exhaust port 14f is provided so as to communicate the bottom surface 14a corresponding to the combustion chamber with the second side surface 14c. The cylinder head cover 15 is coupled to the top portion of the cylinder head 14.

An oil pan 17 is coupled to the lower surface of the crankcase 12 at a position substantially corresponding to a position immediately below the crankshaft 11. Lubricating oil is stored in the oil pan 17. The crankcase 12 is provided with an oil pump 18 rotationally driven in conjunction with the rotation of the crankshaft 11. The lubricating oil stored in the oil pan 17 is introduced into an oil pump 18 via an oil strainer 19, and is supplied to each sliding portion of the engine body 10 by the oil pump 18.

The oil pan 17 constitutes the lowest part of the engine body 10. Referring also to FIG. 1, the oil pan 17 is positioned above the vehicle body floor 8.

As described above, in the engine body 10, the crankcase 12 has the cylinder block coupling surface 12a inclining forward and downward, and the cylinder block 13, the cylinder head 14, and the cylinder head cover 15 are coupled in this order in a direction (i.e., in the axial direction of the cylinder 13a) orthogonal to the cylinder block coupling surface 12a.

The clutch 20 transmits in a connectable/disconnectable manner the rotation torque output from the crankshaft 11 to a transmission input shaft 31 of the transmission 30. In the present embodiment, the clutch 20 has two power transmission paths including a first clutch 21 and a second clutch 22.

That is, according to the clutch 20, it is configured to be switchable among an odd-numbered speed shift stage power transmission state in which the rotation torque from the crankshaft 11 is transmitted to the transmission input shaft 31 via the first clutch 21 so as to constitute an odd-numbered speed shift stage, an even-numbered speed shift stage power transmission state in which the rotation torque from the crankshaft 11 is transmitted to the transmission input shaft 31 via the second clutch 22 so as to constitute an even-numbered speed shift stage, and a neutral state in which the power transmission to the transmission input shaft 31 is interrupted. That is, the clutch 20 and the transmission 30 constitute a dual clutch transmission (DCT).

The transmission 30 is a constantly meshing transmission, and has the transmission input shaft 31, a counter shaft 32 constantly meshing with the transmission input shaft 31, a transmission output shaft 33 constantly meshing with the counter shaft 32, and a reverse gear idler shaft 34 meshing with both the counter shaft 32 and the transmission output shaft 33.

Referring also to FIG. 2, the rotation torque output from the transmission output shaft 33 is transmitted to the rear wheels 6 via the drive shaft 23 to rotationally drive the rear wheels 6. Although not illustrated, the drive device is configured to transmit rotation torque from the transmission 30 also to the front wheels 5.

As shown in FIG. 1, a center axis O3 of the transmission input shaft 31 is positioned rearward relative to the center axis O1 of the crankshaft 11. A center axis O4 of the transmission output shaft 33 is positioned rearward relative to the center axis O3 of the transmission input shaft 31. A center axis O5 of the rear wheel 6 is positioned at substantially the same front-rear position as the center axis O4 of the transmission output shaft 33.

The intake system 40 has an intake duct 41, an air cleaner 42, an intake pipe 43, and an intake manifold 44. The intake duct 41 extends rearward from a front end 41*a* opened to a bonnet space Z defined in front of the riding space S, and a rear end 41*b* is connected to an inlet 42*a* of the air cleaner 42. The air cleaner 42 is disposed below the seat 9.

The intake pipe 43 extends rearward from an outlet 42*b* of the air cleaner 42 and is connected to an inlet port 44*a* (see FIG. 2) of the intake manifold 44. As shown in FIG. 2, the intake manifold 44 is connected to the first side surface 14*b* (see FIG. 3) of the cylinder head 14, and has the inlet port 44*a* to which the intake pipe 43 is connected and an outlet port 44*b* branched from the inlet port 44*a* and connected to each of the four intake ports 14*e* (see FIG. 3).

That is, the intake system 40 removes foreign matters through the air cleaner 42 from the intake air sucked via the intake duct 41, introduces the intake air into the intake manifold 44 via the intake pipe 43, and distributes the intake air from the intake manifold 44 to the four intake ports 14*e*. Although not illustrated, the intake pipe 43 may be provided with a throttle body that adjusts the intake air amount. The intake system 40 described above has non-limiting general components, and the details of the individual components do not greatly contribute to the present invention, and may have additional components or, conversely, may not have some components.

As shown in FIG. 1, the exhaust system 50 has an exhaust manifold 51, an exhaust pipe 52, and an exhaust muffler 53. As shown in FIG. 2, the exhaust manifold 51 is connected to the second side surface 14*c* (see FIG. 3) of the cylinder head 14, and has four inlet ports 51*a* connected to the four exhaust ports 14*f* (see FIG. 3) and an outlet port 51*b* in which the four inlet ports 51*a* gather into one.

The exhaust pipe 52 extends rearward from a front end 52*a* connected to the outlet port 51*b* of the exhaust manifold 51, and a rear end 52*b* is connected to an inlet 53*a* of the exhaust muffler 53. The exhaust muffler 53 is positioned below the rear end of the cargo bed 2 and has a tail pipe 53*b* for discharging exhaust gas to the atmosphere.

That is, the exhaust system 50 gathers the exhaust gas discharged from the four exhaust ports 14*f* of the cylinder head 14 into one by the exhaust manifold 51, introduces the exhaust gas into the exhaust muffler 53 via the exhaust pipe 52, performs sound deadening in the exhaust muffler 53, and then discharges the exhaust gas to the atmosphere via the tail pipe 53*b*. Although not illustrated, a catalyst for purifying exhaust gas may be provided in the exhaust pipe 52 or the exhaust muffler 53. The exhaust system 50 described above has non-limiting general configuration, and the details of the individual components do not greatly contribute to the present invention, and may have additional components or, conversely, may not have some components.

As shown in FIG. 1, according to the present embodiment, the engine body 10 has the center axis O2 of the cylinder 13*a* inclining forward and upward. FIG. 1 also indicates, as a comparison example, by one-dot chain line, an engine body 60 having a vertically extending center axis O20 of the cylinder 13*a* and a cargo bed 61 corresponding thereto. As shown in FIG. 1, the overall height of the engine body 10 is made lower than that of the engine body 60.

Moreover, since the center axis O2 of the cylinder 13*a* inclines toward the vehicle front side opposite to the transmission 30, the engine body 10 is configured so that the upper portion of the crankcase 12, the cylinder block 13, the cylinder head 14, and the cylinder head cover 15 are separated from the transmission 30. Therefore, interference between the engine body 10 and the transmission 30 is prevented, and thus the center axis O2 of the cylinder 13*a* is easily inclined forward more greatly.

Therefore, by reducing the overall height of the engine body 10, it is easy to ensure the mountability to the vehicle body frame 4 while ensuring the ground clearance of the engine body 10.

The engine body 10 in the present embodiment is disposed immediately below the front portion of the cargo bed 2, and the engine body 10 and the cargo bed 2 are at least partially overlapping in the vehicle top view shown in FIG. 2. In FIG. 2, the cargo bed 2 is indicated by a two-dot chain line. Specifically, while the crankcase 12 is positioned below the cargo bed 2, each of front ends of the cylinder head 14 and the cylinder head cover 15 are positioned in front of the cargo bed 2.

As a result, as shown in FIG. 1, in combination with the fact that the center axis O2 of the cylinder 13*a* inclines upward and forward, the cargo bed 2 is easily expanded downward as compared with the engine body 60 indicated by the two-dot chain line in FIG. 1, while the engine body 10 is disposed so that the crankcase 12 is positioned below the cargo bed 2.

More specifically, in the present embodiment, in comparison with the cargo bed 61 corresponding to the engine body 60 in which the center axis O20 of the cylinder 13*a* extends in the vertical direction, the cargo bed 2 is easily disposed so that the upper surface of the cargo bed is positioned downward from the rear end to a portion positioned on the rear side of the intake manifold 44 above the crankcase 12. Thus, for example, it is not necessary to lift the cargo to a high position when loading the cargo on the cargo bed 2, and the accessibility to the cargo bed 2 is improved, whereby the usability of the cargo bed 2 is easily improved. Furthermore, since the cargo bed 2 is expanded downward, the volume of the cargo bed is easily increased.

Furthermore, since the center axis O2 of the cylinder 13*a* inclines so that the second side surface 14*c* of the cylinder head 14 is positioned below the first side surface 14*b*, the exhaust manifold 51 connected to the second side surface 14*c* is disposed away from the cargo bed 2. This reduces heat transfer from the exhaust manifold 51 to the cargo bed 2. Therefore, it is easy to reduce the damage due to heat of the article loaded on the cargo bed 2 even though the engine body 10 is mounted below the cargo bed 2.

For example, in the case where a multicylinder engine is employed as the engine body 10 for increasing the output as in the present embodiment, the effect on the center of gravity of the vehicle body becomes more remarkable due to an increase in the engine weight, but in the present embodiment, since the overall height of the engine body 10 can be reduced, the rise of the center of gravity of the vehicle body can be reduced easily. The engine body 10 may be configured by a single-cylinder engine, a two-cylinder engine, a three-cylinder engine, or an engine having five or more cylinders.

In the engine body 10, the crankshaft 11 extends in the vehicle width direction, the engine body 10 and the transmission 30 are disposed adjacent to each other in the front-rear direction, and the center axis O2 of the cylinder 13a inclines upward and forward. Due to these arrangements, while the area occupied by the engine body 10 and the transmission 30 extends in the front-rear direction, the increase in the dimension in the vehicle width direction is reduced as compared with the case where the crankshaft 11 extends in the front-rear direction. Therefore, an increase in the dimension of the vehicle 100 in the vehicle width direction is reduced.

The center axis O5 of the rear wheel 6 is positioned rearward relative to the center axis O1 of the crankshaft 11, the transmission 30 is positioned behind the engine body 10, and the center axis O2 of the cylinder 13a extends forward with respect to the center axis O1 of the crankshaft 11. Due to these arrangements, the transmission 30 is easily disposed close to the rear wheel 6 in the front-rear direction, and the power transmission path from the transmission 30 to the rear wheel 6 is easily made short.

Since the transmission 30 is configured as a gear-meshing transmission, it is easy to increase in size as compared with, for example, continuously variable transmission (CVT), but by inclining the center axis O2 of the cylinder 13a to the side (front side) opposite to the transmission 30, it is easy to ensure a space to dispose the transmission 30 behind the engine body 10.

Since the engine body 10 has a low overall height and is disposed above the vehicle body floor 8, the ground clearance of the engine body 10 is easily ensured.

Figure 4:
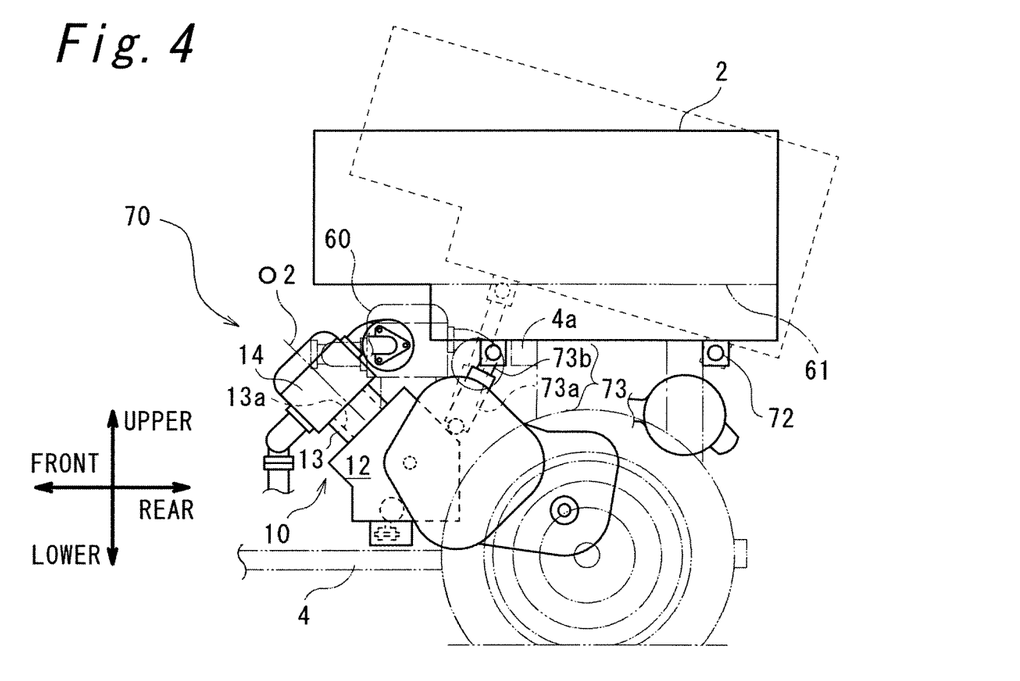
FIG. 4 is a left side view showing the rear of an off-road vehicle according to a variation.

FIG. 4 is a left side view showing the periphery of the cargo bed 2 of a vehicle 70 according to a variation. As shown in FIG. 4, the vehicle 70 is different from the vehicle 100 in that the vehicle 70 includes a dump mechanism 71. That is, the difference lies in that while the cargo bed 2 of the vehicle 100 is fixed to the cargo bed support frame 4a, the cargo bed 2 of the vehicle 70 is configured to be capable of a dumping operation. Specifically, the cargo bed 2 of the vehicle 70 is pivotally supported by the dump mechanism 71 with respect to the vehicle body frame 4 so as to be movable (also referred to as a dumping operation) between a normal position (indicated by a solid line) placed on the cargo bed support frame 4a and a dumping position (indicated by a broken line) at which the front portion is raised.

The dump mechanism 71 includes a pivot portion 72 rotatably and pivotally supported on the vehicle body frame 4 at a rear lower part of the cargo bed 2. The dump mechanism 71 includes a dump actuator 73 that moves the cargo bed 2 to the dumping position or assists the movement of the cargo bed 2 to the dumping position. In the present embodiment, the dump actuator 73 is configured by a hydraulic cylinder.

The dump actuator 73 has a body portion 73a and a rod portion 73b configured to protrude from and retract into the body portion 73a. The dump actuator 73 is pivotally supported by the vehicle body frame 4 at the lower end of the body portion 73a, and the rod portion 73b protrudes upward from the upper end. The dump actuator 73 is coupled to the lower part of the cargo bed 2 at the tip of the rod portion 73b.

According to the dump actuator 73, the rod portion 73b is caused to protrude from the body portion 73a by supplying hydraulic pressure to the body portion 73a, whereby the cargo bed 2 is rotated clockwise in FIG. 4 around the pivot portion 72 to move the cargo bed 2 to the dumping position or assist the movement of the cargo bed 2 to the dumping position.

According to the vehicle 70, even when the dump actuator 73 is provided below the cargo bed 2, since the engine body 10 is configured to be compact in the vertical direction, it is easy to reduce interference between the dump actuator 73 and the engine body 10.

Since the engine body 10 has the center axis O2 of the cylinder 13a inclining forward and upward, a space in which the cylinder block 13 and the cylinder head 14 are not present is formed above the crankcase 12, and the dump actuator 73 is disposed by using the space. That is, in the present embodiment, while the dump actuator 73 is disposed immediately above the crankcase 12, interference with the dump actuator 73 and the engine body 10 and the intake manifold 44 disposed behind the engine body 10 is prevented. In the present embodiment, since the exhaust manifold 51 is positioned on the front side of the cylinder head 14, the dump actuator 73 is easily disposed away from the exhaust system 50, and the influence on the dump actuator 73 due to heat radiant from the exhaust system 50 can be reduced.

Thus, the dump actuator 73 can be easily disposed on the more front side of the cargo bed 2, i.e., the cargo bed 2 can be supported at a position further forward away from the pivot portion 72. Therefore, the pivot portion 72 (fulcrum) is disposed at the rear end of the cargo bed 2, and the connection portion (point of effort) of the dump actuator 73 to the cargo bed 2 is disposed in the vicinity of the engine body 10 positioned on the front side of the cargo bed 2. Therefore, since the point of effort can be disposed at a position apart from the fulcrum, the rotational moment around the pivot portion 72 by the dump actuator 73 can easily be increased based on the principle of leverage. Therefore, the cargo bed 2 is easily caused to perform a dumping operation by the dump actuator 73. Since it is easy to increase the rotational moment by the dump actuator 73, it is possible to reduce the force and eventually the size of the dump actuator 73.

Figure 5:
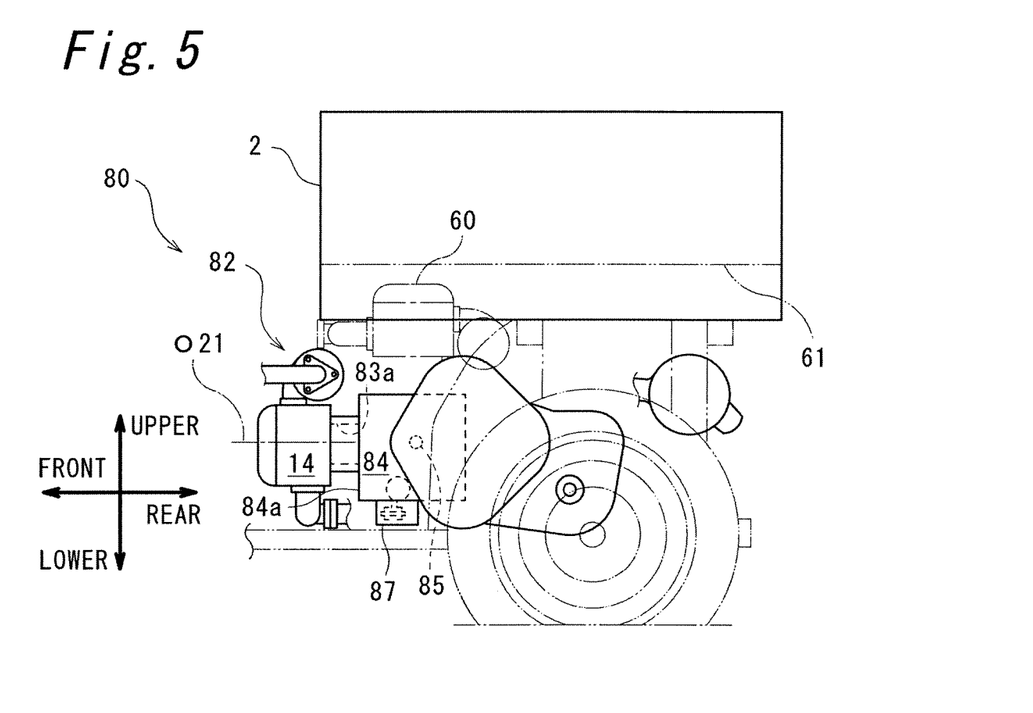
FIG. 5 is a left side view showing the rear of an off-road vehicle according to another variation.

FIG. 5 is a left side view showing the periphery of the cargo bed 2 of a vehicle 80 according to another variation. As shown in FIG. 5, the vehicle 80 is different from the vehicle 100 in that the vehicle 80 has, in replace of the engine body 10, an engine body 82 in which a center axis O21 of a cylinder 83a falls further forward and extends horizontally. That is, the center axis O21 of the cylinder 83a extends forward crossing at an angle of 90 degrees with respect to the vertical direction, and a cylinder block mounting surface 84a of a crankcase 84 extends in the vertical direction. As a result, the cargo bed 2 is expanded downward including the front end thereof with respect to the vehicle 100.

According to the vehicle 80, since it is possible to further reduce the overall height of the engine body 82, it is possible to further expand the cargo bed 2 downward in the front-rear direction as compared with the cargo bed 61 corresponding to the engine body 60 in which the center axis O20 of the cylinder 13a extends in the vertical direction. Even in this case, an oil pan 87 is disposed at a position substantially corresponding to a position immediately below a crankshaft 85.

Figure 6:
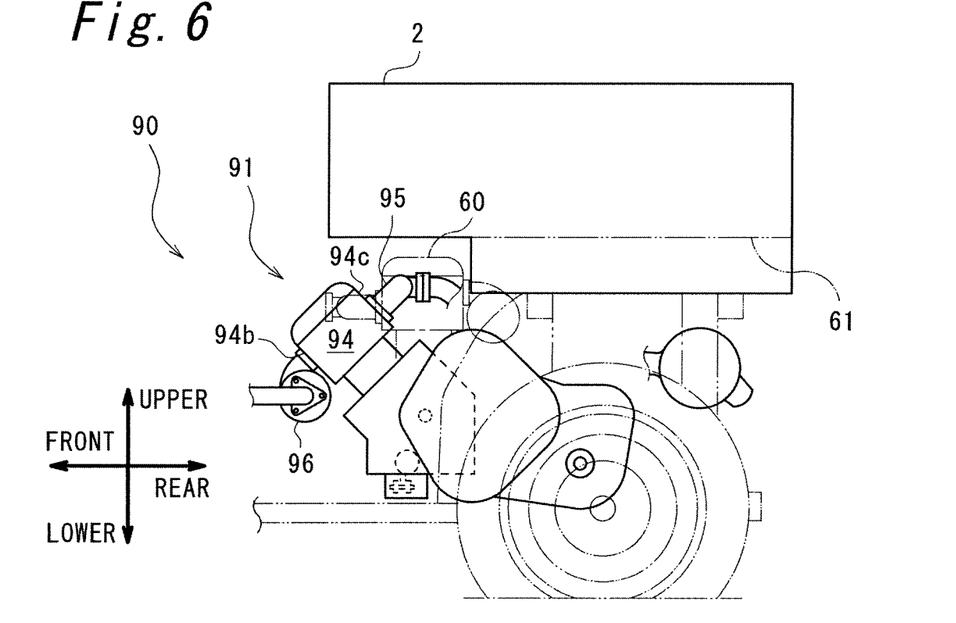
FIG. 6 is a left side view showing the rear of an off-road vehicle according to yet another variation.

FIG. 6 is a left side view showing the periphery of the cargo bed 2 of a vehicle 90 according to yet another variation. As shown in FIG. 6, the vehicle 90 is different from the vehicle 100 in that the vehicle 90 has, in replace of the engine body 10, an engine body 91 in which a first side surface 94b and a second side surface 94c of a cylinder head 94 are exchanged with respect to the engine body 10. That is, the engine body 91 has the first side surface 94b positioned at the front lower part of the cylinder head 94, and the second side surface 94c positioned at the rear upper part of the cylinder head 94.

As a result, an exhaust manifold 95 is positioned on the cylinder head 94 on a side (rear upper side) close to the cargo bed 2, and an intake manifold 96 is positioned on a side (front lower side) apart from the cargo bed 2. This also makes it possible to reduce the overall height of the engine body 91 similarly. In consideration of heat transfer to the cargo bed 2, it is preferable that the exhaust manifold 95 is positioned on the cylinder head 14 on a side (front lower side) apart from the cargo bed 2, such as the engine body 10.

Second Embodiment

Figure 7:
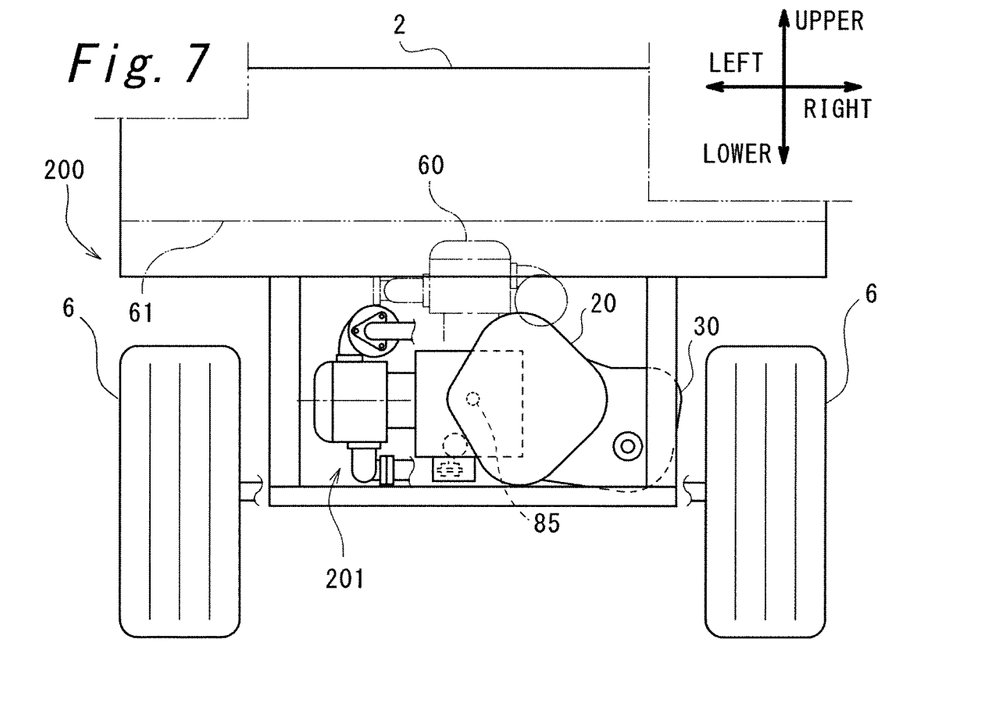
FIG. 7 is a rear view of an off-road vehicle according to a second embodiment of the present invention.

FIG. 7 is a rear view showing a vehicle 200 according to the second embodiment. As shown in FIG. 7, the vehicle 200 is different from the vehicle 80 in that the vehicle 200 has, in replace of the engine body 82, an engine body 201 in which the crankshaft 85 extending in the vehicle front-rear direction. Specifically, the engine body 201, the clutch 20, and the transmission 30 are mounted on the vehicle body frame 4 while being rotated horizontally by 90 degrees with respect to the vehicle 80. This also makes it possible to reduce the overall height of the engine body 201.

The present invention is not limited to the configuration described in the above embodiments, and various variations are possible.

In the above embodiments, the off-road vehicle is described as an example, but the present invention may be applied to a passenger car.

While the above embodiments have been described with the example of a four-wheel vehicle, the number of wheels is not limited. For example, the present invention may be applied to a vehicle having a continuous track instead of a wheel.

In the above embodiments, a vehicle having the front seat 9 including a driver seat and a passenger seat has been described as an example, but the number of seats to be mounted on the vehicle and the position of disposing them are not limited. The present invention is applicable to a vehicle of any assumed occupant.

As described in the above embodiments, the present invention is preferably carried out in a vehicle having a cargo bed, but the present invention is also applicable to a vehicle having no cargo bed. In this case, it is possible to achieve an effect that the center of gravity of the engine body can be lowered while ensuring the ground clearance.

In the above embodiments, an example in which the transmission 30 is a DCT has been described, but the present invention can also be applied to vehicles equipped with various transmissions, for example, a vehicle equipped with a CVT.

What is claimed is:

1. An off-road vehicle, comprising:
an engine body having a cylinder and a crankshaft, a center axis of the crankshaft extending in a vehicle width direction;
a transmission disposed adjacent to the engine body in a direction orthogonal to the center axis of the crankshaft;
a cargo bed disposed above the engine body;
a vehicle body frame; and
a dump actuator,
wherein:
the cylinder has a center axis which: (i) is inclined to a first side which is opposite to a second side on which the transmission is disposed; or (ii) extends horizontally to the first side;
the engine body is an in-line engine;
the engine body and the cargo bed are at least partially overlapping in a vehicle top view;
the cargo bed is pivotally supported to the vehicle body frame so as to be movable between a normal position on the vehicle body frame and a raised dumping position;
the dump actuator is configured to move the cargo bed to the raised dumping position or assist movement of the cargo bed to the raised dumping position;
the dump actuator is disposed below the cargo bed and immediately above a crankcase; and
the cargo bed has a bottom plate which extends forward from a rear end of the cargo bed at a height position corresponding to a cylinder head to reach above the crankcase, the bottom plate including a front end portion located one step higher than the cylinder head.

2. The off-road vehicle according to claim 1, wherein:
the engine body has the cylinder head in which an exhaust port and an intake port are defined;
the cylinder head includes a first side surface positioned on a first side in a direction orthogonal to the center axis of the crankshaft and the center axis of the cylinder and the intake port is configured to be open, and a second side surface positioned on a second side and the exhaust port is configured to be open; and
the second side surface is positioned below the first side surface.

3. The off-road vehicle according to claim 1, wherein the engine body is a multi-cylinder engine.

4. The off-road vehicle according to claim 1, wherein the center axis of the cylinder extends in the first side crossing at an angle of 90 degrees with respect to the vertical direction.

5. The off-road vehicle according to claim 1, further comprising:
a rear wheel configured to be rotationally driven by rotation torque output from the transmission,
wherein:
a center axis of the rear wheel is positioned on a rear side relative to the center axis of the crankshaft;
the transmission is disposed on a rear side of the engine body; and
the cylinder extends forward with respect to the crankshaft.

6. The off-road vehicle according to claim 1, wherein the transmission is a gear-meshing transmission.

7. The off-road vehicle according to claim 1, further comprising:
a vehicle body floor constituting a bottom portion in a riding space for an occupant to ride in,
wherein the engine body is positioned above the vehicle body floor.

8. A vehicle, comprising:
a cargo bed;
an engine body disposed below the cargo bed and having a cylinder and a crankshaft, a center axis of the crankshaft extending in a vehicle width direction;
a transmission disposed adjacent to the engine body in a direction orthogonal to the center axis of the crankshaft;
a vehicle body frame; and
a dump actuator, wherein:
the cylinder has a center axis which: (i) is inclined to a first side which is opposite to a second side on which the transmission is disposed; or (ii) extends horizontally to the first side;
the engine body is an in-line engine;
the cargo bed is pivotally supported to the vehicle body frame so as to be movable between a normal position on the vehicle body frame and a raised dumping position;
the dump actuator is configured to move the cargo bed to the raised dumping position or assist movement of the cargo bed to the raised dumping position;
the dump actuator is disposed below the cargo bed and immediately above a crankcase; and
the cargo bed has a bottom plate which extends forward from a rear end of the cargo bed at a height position corresponding to a cylinder head to reach above the crankcase, the bottom plate including a front end portion located one step higher than the cylinder head.

9. The off-road vehicle according to claim 1, wherein:
the cylinder head includes a first side surface at which an inlet port is open; and
the first side surface of the cylinder head is positioned on a side adjacent to the dump actuator.

* * * * *